Sept. 22, 1959     R. E. SUTHERLAND     2,905,626
TREATMENT OF GAS STREAMS OBTAINED FROM THE
HYDROFORMING OF A NAPHTHA
Filed Oct. 23, 1956
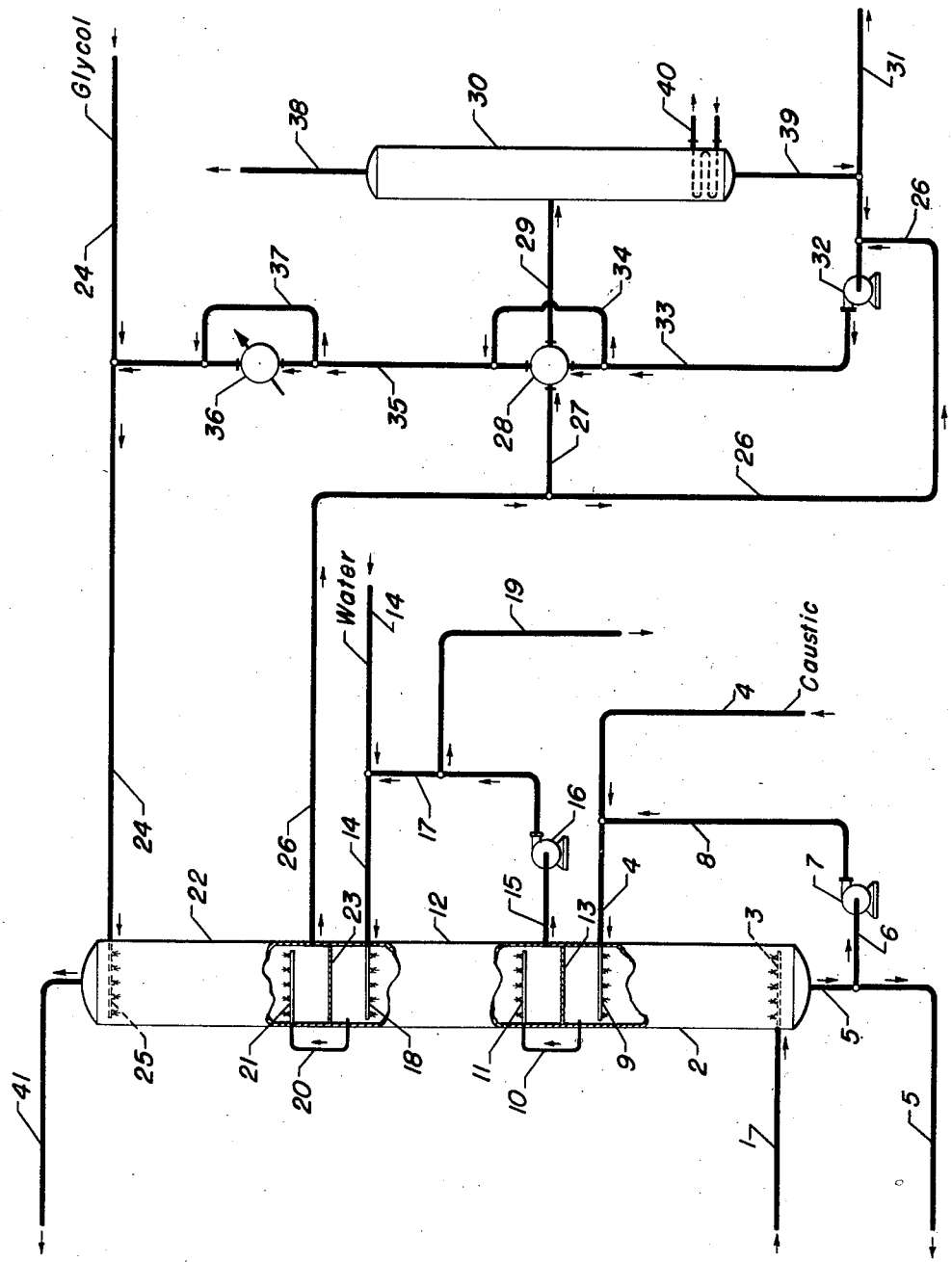
INVENTOR:
Robert E. Sutherland
BY:
Chester J. Giuliani
Bernard L. Kramer
ATTORNEYS.

United States Patent Office

2,905,626

TREATMENT OF GAS STREAMS OBTAINED FROM THE HYDROFORMING OF A NAPHTHA

Robert E. Sutherland, Chicago, Ill., assignor, by mesne assignments, to Universal Oil Products Company, Des Plaines, Ill., a corporation of Delaware Application October 23, 1956, Serial No. 617,803

9 Claims. (Cl. 208—97)

This invention relates to the treatment of gas streams and more particularly to a novel combination of mutually related and interdependent steps for the removal of acidic components from gas streams.

While the present invention may be utilized for the treatment of any gas stream containing acidic components, it is particularly applicable for the treatment of gas streams separated from other effluent products of a catalytic reforming process. Such gas streams comprise principally hydrogen, but contain hydrogen sulfide formed in the catalytic reforming process or introduced thereto along with the charge to the reforming zone. The hydrogen generally is recycled for reuse in the reforming process and the removal of hydrogen sulfide therefrom is imperative in order to avoid the objectionable effect of the sulfur on the reforming catalyst and to avoid the build-up of hydrogen sulfide in the recycle gas stream.

While any suitable catalytic reforming process may be employed, a particularly effective catalytic reforming process is known as "Platforming." In this process, a gasoline fraction, which may be either a full boiling range gasoline or a selected fraction thereof, referred to as naphtha, is subjected to reforming in the presence of a catalyst comprising alumina, platinum and combined halogen. The composition of this catalyst is described as containing from about 0.01 to about 5% by weight of platinum and from about 0.1 to about 8% by weight of combined halogen, the latter preferably comprising a mixture of combined fluorine and combined chlorine. While such a catalyst generally is preferred, it is understood that gas streams from other catalytic reforming processes may be treated in accordance with the present invention. In these other processes, the catalyst may comprise a noble metal component, including platinum, palladium, rhodium, ruthenium, silver, gold, etc., or mixtures thereof composited with a refractory oxide, including alumina, silica, magnesia, zinc oxide, etc., or composites of silica-alumina, silica-magnesia, silica-alumina-magnesia, silica-zirconia, silica-alumina-zirconia, silica-thoria, silica-alumina-thoria, alumina-boria, etc. These catalysts may or may not contain combined halogen. Other catalytic reforming processes may utilize catalysts comprising alumina-molybdenum oxide, alumina-chromia, and the like.

The catalytic reforming process generally is effected at a temperature within the range of from about 700° to about 1100° F., preferably from about 800° to about 1000° F., a pressure within the range of from about 100 to 1500 p.s.i., preferably from about 200 to about 1000 p.s.i., a liquid hourly space velocity, defined as the volume of hydrocarbons per volume of catalyst present in the reaction zone, of from about 0.1 to about 10, preferably from about 0.5 to about 5, and in the presence of hydrogen in a mol ratio to hydrocarbon of from about 0.1 to about 15, preferably from about 1 to about 10. As hereinbefore set forth, a hydrogen gas stream is separated from the effluent products and is recycled for further use within the reforming process. However, the hydrogen stream contains hydrogen sulfide which must be removed, and this is accomplished by the novel combination process of the present invention.

Other processes in which hydrogen gas streams are utilized include dehydrogenation, dehydrocyclization, isomerization, hydrogenation, desulfurization, denitrogenation, etc., and when the hydrogen stream contains acidic components, the hydrogen stream advantageously is treated in accordance with the present invention.

In one embodiment the present invention relates to a process for removing acidic component from a gas stream containing the same, which comprises contacting said gas stream in a first zone with dilute alkali metal hydroxide solution to remove acidic component from the gas stream, separately withdrawing from the first zone a gas stream reduced in acidic component but containing alkali metal hydroxide, contacting said gas stream in a second zone with water to remove alkali metal hydroxide from the gas stream, separately withdrawing from the second zone a gas stream reduced in acidic component and alkali metal hydroxide but containing water, and contacting said gas stream in a third zone with a glycol to remove water from the gas stream.

The novel combination process of the present invention offers numerous advantages. Of utmost importance is the fact that the process effectively removes acidic components and particularly hydrogen sulfide from the gas stream. When the alkali metal hydroxide employed is caustic (sodium hydroxide), sodium sulfides are formed and the sodium sulfides are recovered and may be sold to tanneries or for any other suitable use. Alkali metal hydroxide carried over with the gas stream is removed by water washing and this insures a recycle gas stream free from alkali metal hydroxide which may be injurious to the reforming catalyst. Water carried over in the recycle gas stream is removed by treatment with a glycol and this insures a substantially dry gas stream for recycling. The glycol used to remove water carried over in the gas stream is readily regenerated for reuse. From the above, it will be noted that the chemical consumption is extremely low, thus resulting in an effective and economical process.

The invention is further explained with reference to the accompanying flow diagrammatic drawing which illustrates several specific embodiments. It is understood that the drawing is submitted for illustrative purposes and not with the intention of unduly limiting the broad scope of the present invention thereto.

Referring to the drawing, a gas stream is introduced through line 1 to zone 2, preferably through a suitable distributing device indicated as 3. As hereinbefore set forth, any gas stream containing acidic components and particularly hydrogen sulfide may be treated in accordance with the present invention. A particularly preferred gas stream is the hydrogen stream containing hydrogen sulfide separated from the other products of a catalytic reforming process.

In zone 2 the gas stream is passed in countercurrent contact with a caustic solution introduced through line 4 and/or recirculated by way of lines 5 and 6, pump 7 and lines 8 and 4. The caustic solution preferably is introduced into zone 2 by means of a suitable distributing device illustrated as 9. Zone 2 preferably contains suitable contacting equipment, such as bubble trays, bubble decks, side-to-side pans, etc., in order to obtain intimate contact of the recycle gas stream with the caustic solution. In a preferred embodiment, zone 2 contains bubble trays upon which a level of caustic solution is maintained, the caustic solution passing downwardly through a downspout to a lower tray and is replaced by caustic solution descending from an upper tray. The gas stream rises through vaporizers into and through the level of caustic maintained on the trays.

Any suitable alkali metal hydroxide solution may be employed in zone 2, including caustic (sodium hydroxide) solution, potassium hydroxide solution, lithium hydroxide solution, etc. or mixtures thereof. In some cases an alkaline earth metal hydroxide solution may be employed including calcium hydroxide solution, barium hydroxide solution, strontium hydroxide solution, or mixtures thereof or of the alkali and alkaline earth metal hydroxides. It is understood that the various solutions are not necessarily equivalent. The treating solution used in zone 2 is a dilute solution in order to dissolve sulfides formed therein and to maintain them in solution for removal from this zone. The use of a concentrated solution will result in precipitation of the sulfides, depositing of the sulfides on the internal equipment in zone 2 and plugging of the bubble trays, etc. The strength of the treating solution to be used will depend upon the particular treating solution employed and upon the temperature of operation. For example, when using sodium hydroxide solution at a temperature of about 100° F., the concentration of the solution should be below about 23° Baumé. The caustic solution thus may range from 1° to 23° Baumé for use at 100° F. and preferably is from about 5° to about 20° Baumé. When a higher temperature is employed, generally with a higher pressure, a more concentrated treating solution may be used.

The caustic solution is withdrawn from zone 2 through line 5 and may be removed, all or in part, from the process. Preferably at least a portion of the caustic solution is recycled in the manner hereinbefore set forth in order to effect substantially complete utilization of the caustic before withdrawing the same from the process.

The ascending gas stream passes from the upper portion of zone 2 through line 10 into zone 12, preferably through a suitable distributing device indicated as 11. In the embodiment illustrated in the drawing, zone 12 is separated from zone 2 by means of solid plate 13. In another embodiment, zone 12 may be in open communication with zone 2, and the water introduced into zone 12 passes downwardly into zone 2. In this embodiment of the invention, caustic introduced through line 4 may be concentrated, for example, having a gravity of from about 40 to about 48° Baumé, and the concentrated caustic is diluted in situ by the water descending from zone 12 into zone 2.

In zone 12 the ascending gas stream is intimately contacted with water introduced to zone 12 through line 14 and/or recirculated by way of line 15, pump 16, line 17 and line 14. The water preferably is introduced into zone 12 through a suitable distributing device illustrated as 18. Zone 12 likewise preferably contains suitable contacting equipment as described in connection with zone 2. Also, in a preferred embodiment, a level of water is maintained on each tray, the water passing downwardly to the lower tray and the gas stream rising through vaporizers into and through the level of water maintained on the trays. The amount of water to be used should be sufficient to remove all alkali metal hydroxide from the ascending gas stream. In one embodiment, the excess water passes into zone 2 and eventually is removed through line 5. In another embodiment, excess water may be removed from the system through line 19, particularly in the embodiment of the invention when the water does not pass from zone 12 into zone 2.

The ascending gas stream passes from the upper portion of zone 12 through line 20 into zone 22, preferably through a suitable distributing device indicated as 21.

In the embodiment illustrated in the drawing, zone 22 is separated from zone 12 by means of solid plate 23. In zone 22 the ascending gas stream is intimately contacted with glycol introduced to zone 22 through line 24, and/or recycled in the manner to be hereinafter set forth. Glycol preferably is introduced into zone 22 through a suitable distributing device illustrated as 25. Zone 22 similarly preferably contains suitable contacting means as described in connection with zone 2. Also, in a preferred embodiment, a level of glycol is maintained on each tray, the glycol passing downwardly to lower trays and the gas stream rising into and through the level of glycol maintained on the tray.

Any suitable glycol may be used in accordance with the present invention and preferably is substantially anhydrous. Preferred glycols comprise alkylene glycols, including ethylene glycol, propylene glycol, butylene glycol, glycerol, trimethyl gycol and other di- and trihydroxy substituted aliphatic compounds containing up to about 5 carbon atoms per molecule, or mixtures thereof. Other glycols include diethylene glycol (alpha, omega-dihydroxy-diethylene oxide), triethylene glycol (alpha, omega-dihydroxy-oxyethylene-diethylene oxide), tetraethylene glycol, dipropylene glycol, etc., containing not more than about four oxyalkylene units per molecule. It is understood that alcohol ethers of the glycols may be employed in some cases, including the methyl, ethyl, propyl and butyl ethers of mono-, di- and triethylene glycols. In some cases the organic acid esters of glycols may be employed including, for example, the formic acid, acetic acid and propionic acid esters of both the mono- and polyethylene and mono- and polypropylene glycols, including the diesters of the alpha and omega hydroxyl groups. It is understood that mixtures of these may be employed and that all of them are not necessarily equivalent, but that the particular glycol to be used will depend upon the specific gas stream to be treated and the temperature to be employed.

The amount of glycol to be employed will be sufficient to effect substantially complete removal of water from the ascending gas stream. This will depend upon the particular gas stream being treated and the retention of water therein in zone 12. In any event, the glycol solution is withdrawn from zone 22 through line 26 and preferably is directed through line 27, heat exchanger 28 and line 29 to regenerator 30. When desired, at least a portion of the glycol solution may be recirculated to zone 22 by way of lines 26 and 31, pump 32, line 33, exchanger 28, line 35, cooler 36 and line 24. All or part of this stream may bypass exchanger 28 by being directed through line 34 and/or cooler 36 by being passed through line 37.

Preferably at least a portion of the glycol solution is directed through line 27, exchanger 28 and line 29 to regenerator 30 wherein the glycol is regenerated for reuse in the process. The regeneration is accomplished by heating in zone 30 to a sufficient temperature to drive off water which is removed from zone 30 through line 38, and to leave a regenerated glycol solution which is withdrawn from zone 30 through line 39. In the case here illustrated, a heating medium from a suitable source is passed through reboiler 40. The exact temperature of heating in zone 30 will depend upon the particular glycol being employed, but in general will be within the range of from about 220° to about 350° F., or more.

The regenerated glycol is withdrawn from zone 30 through line 39 and all or a portion may be removed from the process through line 31, preferably at least a portion being returned to zone 22 by way of line 31, pump 32, line 33, heat exchanger 28, line 35, cooler 36 and line 24. Here again, all or a portion of the regenerated glycol may bypass exchanger 28 and cooler 36 in the manner hereinbefore described. However, in most cases, zone 22 will be operated at a moderate temperature and, therefore, it is necessary to cool the regenerated glycol prior to return to zone 22.

While a preferred embodiment of the invention contemplates the countercurrent contact of the ascending gas stream with the caustic, water and glycol, it is understood that a pool of these agents may be maintained in the proper zones and the ascending gas stream passed therethrough. Furthermore, while a single vessel is illustrated in the drawing, it is understood that these zones may comprise separate vessels, with suitable piping to arrange them in the desired sequence.

In a preferred embodiment, zones 2, 12 and 22 are operated at substantially the same temperature and pressure. In general, the temperature employed will be from ambient to about 150° F. although higher temperatures may be employed. When higher temperatures are employed, higher pressures are required in order to maintain the treating agents in substantially liquid phase, and the pressures thus may range from 50 to 1000 p.s.i. or more, and preferably within the range of from about 100 to about 500 p.s.i. Glycol regenerator 30 preferably is operated under atmospheric or subatmospheric pressure. The use of vacuum is of advantage in effecting regeneration of the glycol at lower temperature.

The treated hydrogen stream is withdrawn through line 41 from the upper portion of zone 22 and generally will be recycled for further use in the process from which it came. This hydrogen stream now is substantially reduced in acidic components and is substantially free from caustic, water and glycol.

The following example is introduced to illustrate further the novelty and utility of the present invention but not with the intention of unduly limiting the same.

*Example I*

The hydrogen gas to be treated in this example is separated from the other products of a catalytic reforming process and contains about 16 grains per hundred cubic feet of hydrogen sulfide. It is introduced into the lower portion of zone 2 at a temperature of about 100° F. and a pressure of about 200 pounds per square inch. 30° Baumé caustic solution is introduced through line 4 at substantially the same temperature and pressure and is passed countercurrently to the ascending gas stream. The gas stream then passes into zone 12. Water is introduced into zone 12 at substantially the same temperature and pressure and is passed countercurrently to the ascending hydrogen stream. The ascending hydrogen stream then is directed into zone 22 where it is passed in countercurrent contact with diethylene glycol introduced thereto at substantially the same temperature and pressure.

For treating the hydrogen gas stream described above at a rate of approximately 10.5 million cubic feet per day, approximately 3.6 barrels per day of 30° Baumé caustic, 15.6 barrels per day of water and 133 barrels per day of diethylene glycol are utilized. The diethylene glycol is continuously regenerated by heating under vacuum at a temperature of about 280° F. The regenerated glycol is cooled in exchanger 28 to about 120° F. and further cooled in cooler 36 to about 100° F. In this example, zones 12 and 2 are in open communication and water passes from zone 12 to zone 2. The caustic solution is recirculated by way of lines 6, 8 and 4 at a rate of about 100 barrels per day. Approximately 15 barrels per day of caustic solution is withdrawn through line 5.

An operation as described above serves to produce a treated hydrogen gas stream substantially reduced in hydrogen sulfide, generally to less than 5 grains per hundred cubic feet, and substantially free from caustic, water and glycol.

I claim as my invention:

1. A process for removing acidic component from a gaseous hydrogen stream containing the same, which comprises contacting said gas stream in a first zone with dilute alkali metal hydroxide solution to remove acidic component from the gas stream, separately withdrawing from the first zone a gas stream reduced in acidic component but containing alkali metal hydroxide, contacting said gas stream in a second zone with water to remove alkali metal hydroxide from the gas stream, separately withdrawing from the second zone a gas stream reduced in acidic component and alkali metal hydroxide but containing water, and contacting said gas stream in a third zone with a glycol to remove water from the gas stream.

2. A process for removing acidic components from a gaseous hydrogen stream containing the same, which comprises countercurrently contacting said gas stream in a first zone with dilute caustic solution to remove acidic component from the gas stream, separately withdrawing from the first zone a gas stream reduced in acidic component but containing caustic, countercurrently contacting said gas stream in a second zone with water to remove caustic from the gas stream, separately withdrawing from the second zone a gas stream reduced in acidic component and caustic but containing water, and countercurrently contacting said gas stream in a third zone with a glycol to remove water from the gas stream.

3. The process of claim 2 further characterized in that said contact of the gas stream with caustic solution is effected at a temperature not greater than 100° F. and said caustic solution is of a concentration not greater than about 20° Baumé.

4. The process of claim 2 further characterized in that said glycol is diethylene glycol.

5. A process for removing hydrogen sulfide from a gaseous hydrogen stream containing the same, which comprises contacting said hydrogen stream in a first zone with dilute caustic solution to remove hydrogen sulfide from the hydrogen stream, separately withdrawing from the first zone a hydrogen stream reduced in hydrogen sulfide but containing caustic, contacting said hydrogen stream in a second zone with water to remove caustic from the hydrogen stream, separately withdrawing from the second zone a hydrogen stream reduced in hydrogen sulfide and caustic but containing water, and contacting said hydrogen stream in a third zone with diethylene glycol to remove water from the hydrogen stream.

6. The process of claim 5 further characterized in that said second zone is positioned above said first zone and in open communication therewith, whereby water passes from said second zone to said first zone.

7. The process of claim 6 further characterized in that concentrated caustic solution having a gravity of from about 40° to about 48° Baumé is introduced into said first zone and is therein diluted with the water descending from said second zone into said first zone.

8. A process which comprises subjecting a gasoline fraction to reforming in the presence of hydrogen and a catalyst containing platinum, at a temperature of from about 700° to about 1100° F., separating from the effluent products of said reforming a gaseous hydrogen stream containing hydrogen sulfide, removing hydrogen sulfide from said hydrogen stream by contacting said hydrogen stream separately and successively with dilute alkali metal hydroxide solution, water, and a glycol, recovering from said treatment a hydrogen stream substantially reduced in hydrogen sulfide and substantially free from alkali metal hydroxide, water and glycol, and recycling at least a portion of said last-mentioned hydrogen stream to said reforming as at least part of said first-mentioned hydrogen.

9. A process which comprises subjecting a gasoline fraction to reforming in the presence of hydrogen and a catalyst comprising alumina and platinum, at a temperature of from about 700° to about 1100° F., separating from the effluent products of said reforming a gaseous hydrogen stream containing hydrogen sulfide, removing hydrogen sulfide from said hydrogen stream by contacting said hydrogen stream in a first zone with dilute caustic solution to remove hydrogen sulfide from the hydrogen stream, separately withdrawing from the first zone a hydrogen stream reduced in hydrogen sulfide but containing caustic, contacting said hydrogen stream in a second zone with water to remove caustic from the hydrogen stream, separately withdrawing from the second zone a hydrogen stream reduced in hydrogen sulfide and caustic but containing water, and contacting said hydrogen stream in a third zone with diethylene glycol to remove water from the hydrogen stream, recovering from said third zone a hydrogen stream substantially reduced in hydrogen sulfide and substantially free from caustic, water and diethylene glycol, and recycling at least a portion of said last-mentioned hydrogen stream to said reforming as at least part of said first-mentioned hydrogen.

References Cited in the file of this patent

UNITED STATES PATENTS

| | | |
|---|---|---|
| 2,324,955 | Rupp et al. | July 20, 1943 |
| 2,409,690 | Nicholson et al. | Oct. 22, 1946 |
| 2,730,556 | Liedholm | Jan. 10, 1956 |
| 2,758,064 | Haensel | Aug. 7, 1956 |
| 2,766,179 | Fenske et al. | Oct. 9, 1956 |
| 2,772,217 | Nicholson | Nov. 27, 1956 |